Patented Oct. 2, 1945

2,385,930

UNITED STATES PATENT OFFICE 2,385,930

POLYBASIC ACID-POLYHYDRIC ALCOHOL ESTERS AND POLYMERS THEREOF

Irving E. Muskat and Franklin Strain, Akron, Ohio, assignors to Pittsburgh Plate Glass Company, Allegheny County, Pa., a corporation of Pennsylvania No Drawing. Application October 15, 1940, Serial No. 361,281

8 Claims. (Cl. 260—78)

This invention relates to novel compositions, polymers of such compositions, and methods of preparing such polymers. In accordance with the present invention we have prepared a novel class of complex esters of allyl alcohol. More particularly the invention relates to the complex esters of polyhydric compounds and acid esters of allyl alcohol and a polybasic acid. Of especial interest are the esters of glycerol, polyglycerols, glycols, alkylene glycols, or polyglycols such as ethylene glycol, or the polyethylene glycols such as di-, tri-, or tetraethylene glycol, propylene glycol, butylene glycol, isobutylene glycol, dipropylene glycol, tripropylene glycol, dibutylene glycol, or other glycol or polyglycol such as trimethylene glycol, pentamethylene glycol, pinacol, tetramethylene glycol, alpha methyl tetramethylene glycol, alpha methyl pentamethylene glycol, octamethylene glycol, monomethylene glycol, 1,3-xylylene alcohol decamethylene glycol, etc. Esters of other polyhydric compounds such as methyl glycerol, erythritol, pentaerythritol, polyglycerols, sorbitol, mannitol, halohydrins, such as glycerol monochlorhydrin, resorcinol, pyrogallol, polyhydroxy benzene, polyhydroxy anthracene, or polyhydroxy naphthalene, starch, sugar, phthalyl alcohol, 1,4 - dihydrocyclohexane, 1,4-dioxanediol-2,3; polyvinyl or polyallyl or other polymerized alcohol, cellulose, cellulose hydrate, cellulose monoacetate, cellulose diacetate, cellulose mono or dibutyrate or similar cellulose esters or ethers such as mono or diethyl, methyl or benzyl cellulose may also be prepared.

The partial esters herein contemplated may be esters of any suitable polybasic acid such as carbonic, thiocarbonic, cyanuric kojic or carboxylic acids, such as oxalic, maleic, fumaric, dimethyl maleic, tartaric, succinic, malonic, phthalic diglycolic, dilactic, glutaric, adipic, pimelic, sebacic, itaconic, mesaconic, citraconic, citric, malic, terephthalic, acetone dicarboxylic acid, tricarballylic, and other organic acids or inorganic polybasic acids, such as sulphuric, sulphurous, phosphoric, phosphorous, boric, silicic, titanic, or chromic acids, etc. Likewise, the corresponding thio acids of the above mentioned carboxylic acids may be treated in this manner.

These compounds may be prepared by various methods, such as by esterifying the partial ester. For example, an acid ester of a polybasic acid and an allyl alcohol may be esterified with a polyhydric alcohol. Thus, the allyl acid ester of various acids such as sulphuric, phosphoric, maleic, malonic, oxalic, tartaric, citric, or similar acid may be esterified with ethylene glycol or diethylene glycol, alkylene oxides, etc. to produce the mixed ester desired. The compounds may also be prepared from the corresponding acid chlorides of the above acid esters such as allyl succinyl chloride. This acid chloride may be reacted with polyhydroxy compounds to form the desired products.

Alternatively, the polyhydric alcohol ester of a polybasic acid such as glycol dihydrogen diphthalate or other ester such as those having the general formula

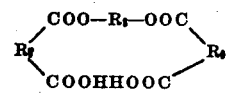

where R7 and R8 are organic radicles and R9 is an alkylene or polyalkylene radicle, or other partial esters of a polyhydric alcohol and a polybasic acid may be esterified with allyl alcohol or with a mixture of such alcohols as methallyl and allyl and crotyl alcohols, etc. The esterification may be effected by heating the acid ester with the desired alcohol in the presence of suitable esterification catalysts, such as p-toluenesulphonic acid, HCl, etc., preferably at a temperature of approximately 100° C.

In order to avoid ester interchange or other side reactions, the corresponding salts may be reacted with an allyl halide such as allyl chloride or bromide. Thus, mono-sodium or potassium or silver salts of various dibasic acids such as phthalic, maleic, fumaric, citraconic, or other acids may be esterified with a polyhydric alcohol such as glycol, diethylene glycol, glycerine, etc., to form the corresponding partial ester or other suitable methods may be used to prepare this ester. Thereafter, the resulting product may be reacted with allyl or methallyl or similar chloride.

In accordance with one suitable method of preparing carbonate esters the allyl chloroformate may be formed and utilized as an intermediate. This compound may be formed, for example, by passing gaseous phosgene through a suitable alcohol. Thereafter, the alcohol and other impurities may be removed by washing the chloroformate with water and drying by means of suitable dehydrating agents, such as calcium chloride, etc. This chloroformate may then be reacted with hydroxy compounds preferably in the presence of an alkaline agent such as pyridine, sodium or potassium hydroxide bicarbonate or carbonate, calcium, magnesium or barium hydroxide or carbonate or other alkaline agent capable of removing HCl which is formed in the reaction. Thus, polyhydric compounds such as glycerol, polyglycerols, glycol, polyglycols such as diethylene, triethylene, dipropylene, tripropylene glycol, mannitol or other polyhydric compound may be reacted with the allyl chloroformate to form the ester. This esterification may be conducted in an aqueous or nonaqueous medium, preferably in an organic solvent such as acetone, dioxane, pyridine, etc. Alternatively, the corresponding polychloroformate of the polyhydric compound may be formed by treatment with phosgene. These chloroformates may then be reacted with allyl alcohol. As in the esterification of the allyl chloroformates the reaction is preferably conducted in the presence of an alkaline agent.

In the preparation of these polychloroformates it is found desirable to regulate the temperature of operation in order to minimize or prevent formation of ring compounds. Thus, in treating glycol, the temperature is preferably maintained below about 20° C. In most cases cooling the reaction mixture by means of an ice bath or equivalent cooling means improves the yields of polychloroformate to a marked degree.

The esters may be recovered from the reaction mixture by distillation. However, these materials are high boiling liquids or solids and this is often difficult. Accordingly, the esters are often purified by washing the reaction mixture with water.

The compositions herein described vary from high boiling point liquids to solids. Many of the liquids are very clear and colorless and are miscible with numerous organic solvents such as acetone, alcohol, chloroform, dioxane, benzene, toluene, xylene, ethyl ether, paraffin hydrocarbons, etc.

These compositions may be used for many purposes such as solvents, paint compositions, pharmaceuticals, plasticizers, etc., for various materials such as cellulose, vinyl, urea, phenol, acrylic or styrene resins or plastics. In particular, the products are found to polymerize in the presence of catalysts, such as heat, light, oxygen, ozone, peroxides such as lauryl or benzoyl peroxide, etc., to form products of desirable character.

By polymerization of these compounds it is possible to secure a wide range of polymers, some of which are extremely hard, while others are soft, flexible and often rubber-like in character. In general, the polymers thus obtained are transparent and colorless, although the polymer occasionally may be slightly yellow. If desired, the compounds herein described may be cast polymerized to form products having various shapes. These polymers in their finally cured state are substantially infusible and insoluble, and in general, are substantially unaffected by acids, alkalies, water or organic solvents.

In accordance with the present invention, intermediate polymers which are fusible or thermoplastic also may be prepared. In general, such polymers are soluble in various organic solvents such as acetone, carbon tetrachloride, benzene, xylene, toluene, dioxane, etc. These fusible polymers may be further polymerized to an infusible state to form products similar to the infusible polymers mentioned above. Thus, the fusible polymer may be molded or otherwise shaped and polymerized by means of heat and/or light to form shaped products which are substantially infusible and insoluble and which retain their shape permanently.

This method of preparing infusible polymers is highly advantageous since it is often found that the production of cast polymers is complicated by the formation of fractures, bubbles, or other defects during polymerization. These difficulties are avoided through use of the fusible polymer. In addition, more completely polymerized products are obtainable by this means.

The fusible polymers herein described may be prepared by polymerizing the unsaturated compounds which contain at least two polymerizable unsaturated groups until substantial polymerization has occurred and interrupting polymerization before the polymer is converted into a gel. It is found that when polymerization of these materials is initiated, a fusible polymer is preliminarily formed. As polymerization proceeds, the monomer-polymer mixture is converted into a gel which is substantially infusible. This polymer does not fuse at atmospheric pressure. Further polymerization hardens the polymer to its final state of polymerization. By interrupting the polymerization, it is possible to remove a portion or all of the monomer and to recover the fusible polymer substantially free from monomer or at least as a concentrate containing substantially less monomer than is present in the monomer-polymer mixture formed by ordinary polymerization of undiluted monomer. This interruption of polymerization may be effected by cooling, addition of inhibitors or by other methods as hereinafter more fully described.

The method of securing the fusible polymer is dependent upon the nature of the material which is undergoing polymerization. In general, it is possible to secure the fusible material in superior yields by polymerizing the monomer in a solution in which the fusible polymer is normally soluble. This polymer is generally soluble in the solvents which are capable of dissolving the usual thermoplastic vinyl or acrylic resins such as polymethyl methacrylate or polyvinyl acetate. Thus, such solvents as acetone, dioxane, chloroform, toluene, benzene, carbon tetrachloride, methyl Cellosolve acetate, phenyl cellosolve, dichlorethyl ether, xylene, tetralin, dibutyl phthalate, trichlorethylene, tetrachloroethane, etc., or mixtures of these solvents generally are found to be suitable. Solutions having concentrations of 10 to 60 percent of monomer yield satisfactory products.

In each case, the polymerization may be interrupted before the infusible product is produced. This may be accomplished by stopping polymerization as the mixture of monomer and polymer begins to grow viscous and before infusible gel formation occurs. In accordance with one illustrative method of interrupting polymerization, the polymer may be separated from the monomer by convenient methods, for example, by the addition of a compound in which the polymers are normally insoluble, such as methyl or ethyl alcohol, petroleum ether, water, ethylene glycol, etc. This process permits the isolation of the fusible polymer in a substantially pure state and is particularly adapted to use when the material is polymerized in solution. Polymerization may also be halted by lowering the temperature of the reaction mixture to a suitable degree, for example, to room temperature or below.

In accordance with another effective method of interrupting polymerization, inhibitors, such as pyrogallol, hydroquinone, aniline, phenylene diamine, sulphur, thiophenol, organic or inorganic salts or complexes of the reduced forms of metals such as copper, manganese, cobalt, nickel, etc., may be added to the polymer during polymerization or before polymerization has been initiated. When the fusible polymer is produced in solution, it may be recovered by methods other than by treatment with a nonsolvent, such as by slow evaporation or distillation of the solvent. These fusible polymers may be extruded, molded, shaped, or otherwise worked into desirable forms and after final shaping, the products may be completely hardened and rendered infusible by suitable methods hereinafter more fully set forth.

In polymerizing the compounds herein contemplated, the time required in order to initiate polymerization and to secure a fusible polymer varies widely in view of slight traces of peroxides or inhibitor which may be present. For this reason, the viscosity of the composition undergoing polymerization is observed and, in general, polymerization is interrupted after the viscosity of the composition has approximately doubled. In many cases, subjection of the compound to polymerization conditions for a period of one-half to two hours is sufficient, although some compounds polymerize somewhat more slowly.

Generally, it is preferred to conduct the polymerization in solution in order to secure improved yields. Thus, it is found that the presence of a solvent substantially improves the yield of fusible polymer. Likewise, addition of inhibitor may improve yields although in such a case the rate of polymerization is comparatively slow.

It is also possible to produce the fusible polymer in accordance with our invention without resorting to the use of solutions of the monomer, although the yield of polymer is, in general, somewhat lower than when a solvent is present. Thus, the monomer may be polymerized directly by use of heat and/or light, preferably in the presence of catalysts, such as air, ozone, oxygen, peroxides, and the like, and interrupting polymerization at the proper time. Since the polymerization may proceed without undue rapidity, with many of these materials, the reaction may be stopped before the infusible gel state is reached without difficulty, either by use of inhibitors or by cooling as hereinbefore mentioned.

The fusible polymer so produced may be molded to any desired shape and subsequently cured to the infusible state. In treating materials which polymerize slowly, it is found that if considerable monomer is retained by the polymer, upon curing, considerable difficulty is encountered in securing complete or substantially complete polymerization of the residual monomer. This may be undesirable. Accordingly, we have found that in most cases it is desirable to remove all or a portion of such monomers from the polymer prior to curing the polymer to its infusible state. In accordance with one convenient method, the monomer may be distilled from the polymer under conditions whereby the possibility of further polymerization is minimized, for example, by distillation in a vacuum, preferably at low temperatures, or in the presence of added inhibitors. Similarly, the monomer may be extracted with a solvent in which the polymer is insoluble such as methyl or ethyl alcohol. Additionally, the polymer and monomer may be separated by dissolving the product in a solvent for both monomer and polymers and adding a nonsolvent to precipitate the fusible polymer.

The selection of a solvent in which to conduct polymerization or a nonsolvent with which to precipitate polymer is dependent upon the nature of the material undergoing polymerization. With such materials as the ethylene glycol diallyl dicarbonate and similar glycol esters of the unsaturated alcohol acid esters of polybasic acids, benzene, acetone, chloroform, xylene, toluene, dioxane, and carbon tetrachloride are suitable solvents. While water and alcohols such as methyl, ethyl, propyl alcohol or glycol or paraffin hydrocarbons are suitable nonsolvents.

The fusible polymers so produced have many characteristics which are similar to those of usual thermoplastic polymers. They are generally soluble in such organic solvents as acetone, dioxane, benzene, toluene, chloroform, ethyl Cellosolve acetate, triacetin, phenol Cellosolve, etc., and soften or flow upon heating under atmospheric pressure. They are precipitated from solutions by use of nonsolvents as white amorphous powder or as plastic semi-liquid resins.

The time required for polymerization to the fusible state is dependent upon the nature of the material, the catalyst concentration and the temperature of polymerization. In the case of the carbonate esters such as glycol diallyl dicarbonate, polymerization in solution for a period of 17 hours is found to be satisfactory when the temperature is 60° C. This period must be materially shortened with rising temperature and at 100° C. it is found that the fusible polymer must be recovered within a few minutes after the polymerization reaction is initiated. Similar variations of time of polymerization in accordance with the temperature is found necessary in treating other polymerizable materials. In any case, however, the polymer is preferably recovered by interrupting polymerization as the monomer undergoing treatment grows viscous since after solidification thereof the polymer may be found to be substantially insoluble.

In accordance with our invention, we have found that upon subjection of these polymers to heating at temperatures somewhat above the softening point thereof, for a sufficient period of time, they are converted into infusible, insoluble, transparent, hard and wear-resistant products. This conversion may be assisted by the incorporation of usual polymerization catalysts, such as oxygen, ozone, air, peroxides, such as hydrogen peroxide, or benzoyl peroxide, basic or acidic catalysts, light, etc. By use of catalysts, it is found that the conversion of these products to the infusible state may be secured at lower temperatures. In order to secure transparent uniform products the polymerization should be controlled to permit the polymer to flow together, or if desired, to become completely molten prior to converting the polymer to its infusible state. The application of superatmospheric pressure assists the production of satisfactory products.

By operating in accordance with the present invention, it is thus possible to form a molded article from the fusible polymer such as the fusible polymeric glycol diallyl dicarbonate, diethylene glycol diallyl dicarbonate, ethylene glycol dimethallyl dicarbonate, or other products previously referred to, and thereafter, to render the molded products insoluble and infusible by heat. In this manner, we are able to prepare transparent, hard, infusible molded products which have many of the desirable properties of the conventionally known thermoplastic resins as well. By proper regulation of the pressure and temperature, the fusible polymer may be extruded under such conditions that it becomes infusible as it leaves the extrusion die.

Since the fusible polymer is a true thermoplastic, it often may be kept in the molten state for an indefinite period, particularly by incorporating an inhibitor such as hydroquinone, whereby conversion to the infusible state may be prevented. Likewise, polymerization may be delayed to such an extent that molten products may be obtained prior to polymerization by utilizing mixtures of catalysts and inhibitors. It is thus possible to form cast or molded products by melting a quantity of the fusible polymer with a quantity of polymerization inhibitor in a suitable mold. These products may then be converted to the infusible state by introduction of catalysts or by catalysts previously introduced. In some cases, polymerization of such products may be assisted by heating the molded or cast material in a molten or solid state in the presence of air, peroxides, etc. In accordance with a further modification, the cast or molded thermoplastic polymer may be coated with a solution of catalyst or a film of monomer or a solution of fusible polymer which contains high catalyst concentration may be applied to the surface of the molded product. Heat, pressure, and/or ultra-violet light may be utilized to convert the polymer to the infusible state.

In addition, it is possible to effect a conversion of the exterior of the plastic without completely converting the interior thereof to the infusible, insoluble state. Thus, cast or molded products, made from the fusible polymers herein described may be subjected to local surface heating whereby the surface is converted without complete conversion of the interior. In this manner, it is possible to secure integral products possessing a great flexibility and resiliency, the surfaces of which are extremely hard and insoluble. Similar products may be secured by increasing the catalyst concentration of the fusible polymer adjacent the surface thereof by suitable methods, for example, by application of a coating containing catalysts as described above. Similar products may be secured by incorporation of an inhibitor in the interior of the product or by varying the amount of plasticizer in the interior and exterior portions of the sheet, whereby the interior converts to a flexible gel due to the presence of added plasticizer.

A large number of inert substances may be incorporated with the fusible polymer before subjecting the molding condition. Suitable for such purposes are: plasticizers, softening agents or fillers, such as dibutyl phthalate, dicyclohexyl phthalate, triacetin, tricresyl phosphate, natural or synthetic resins, pigments, including titanium dioxide, carbon black, chromic oxide, lead chromate, etc., and organic dyestuffs, such as methylene blue, methyl orange, etc.

If desired, similar products may be made from suitable copolymers, for example, the ethylene glycol diester of allyl acid carbonate or similar ester may be copolymerized with other compatible polymerizable materials such as acrylates or alpha-substituted acrylates, for example, methyl, allyl or glycol methacrylate, vinyl acetate, vinyl chloride, styrene, allyl esters such as allyl acetate, maleate, fumarate, phthalate, succinate, oxalate, tartarate, or the corresponding vinyl, crotyl, methallyl, 2-chloroallyl, or other unsaturated alcohol esters to form desirable products in accordance with our invention. Products of widely varying composition containing from 2 to 90 percent of the modifying polymerizable material may be polymerized.

These resins are also suitable for many uses in the field of laminated products. For example, products of great strength, elasticity and adherence may be secured by impregnating fibrous sheets of paper, linen, canvas, etc. with the monomer or polymer herein described, forming a laminated product, and curing the same to an infusible state.

Leather, paper, wood or other comparatively porous substances may be steeped in a solution of the fusible polymer or a molten body thereof, and one or more layers heated under pressure, generally in the presence of catalyst to convert the absorbed polymer to the infusible, insoluble form. Greatly improved products, particularly in regard to strength, waterproofing and electrical properties are obtained.

The polymers which we have prepared are capable of numerous uses such as in lacquers, or other coating compositions, molded articles, safety glass, etc. Where the composition is used for coating, it may be applied in solution or in solid form, either alone or in combination with natural or synthetic drying oils or resins and the like, the solvent removed and the coated article baked to render the surface infusible. In this manner, it is possible to surface other polymers which are less resistant to the action of solvents or of heat. When a coating of the fusible polymer of the compounds herein contemplated is deposited upon polymerized methyl methacrylate or similar polymer and the solvent removed, a coherent surface thereof is formed. Upon heating the coated article to suitable temperatures, this surface may be made transparent, hard, and infusible.

Being of the thermosetting type, these resins do not exhibit the phenomenon of "cold flow" and are thus especially desirable for such uses as airplane windshields, where the pressure differences have been found to bow thermoplastic glass substitutes, particularly at the higher altitudes. Coatings may be applied to metal, glass, wood, synthetic resins, etc. surfaces by extrusion of the heated fusible polymer directly on the suitably-prepared surface. In similar manner, the surface may be heated and the polymer applied in powdered form, whereupon fusion occurs, first to give a smooth, homogeneous film which may then be heat-hardened.

The process may also be extended to the production of mixed polymers or copolymers. Thus, the fusible polymer prepared in accordance with our invention may be mixed with other monomers or polymers, such as the monomer or polymer of methyl methacrylate, methyl chloracrylate, vinyl acetate, vinyl chloracetate, vinyl chloride, styrene, etc., and the mixture subjected to conditions of polymerization.

The following examples are illustrative:

*Example I*

Phosgene was bubbled into a flask containing allyl alcohol at a rate of 20 millimoles per minute while agitating the mixture and cooling to a temperature below about 15 to 20° C. After phosgene in the proportion of about 0.9 mole of phosgene per mole of allyl alcohol had been introduced, the mixture was allowed to stand for one hour. Thereafter, the reaction mixture was washed with water to remove unreacted allyl alcohol and dried over calcium chloride.

2.2 moles of allyl chloroformate was added dropwise to a solution of one mole of ethylene glycol in 2.4 moles of pyridine while cooling the reaction mixture to a temperature of 10 to 15° C. After the chloroformate had been added, the mixture was allowed to stand at room temperature for about one hour. The product was diluted with water, washed with dilute HCl solution and then with sodium chloride solution until the product was neutral. Thereafter, the product was washed with water and dried over calcium chloride. The ethylene glycol bis(allyl carbonate) having a boiling point of about 118–122° C. at 1 mm., an index of refraction of about $N_D^{20}$ 1.4443, a density ($d_4^{20}$) of about 1.114, and having the probable formula

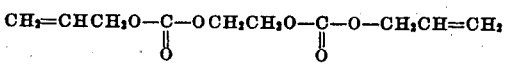

was obtained.

Example II 7.3 moles of allyl chloroformate was added dropwise to a solution of 3.3 moles of triethylene glycol in 8 moles of pyridine while cooling the reaction mixture to a temperature of 10 to 15° C. After the chloroformate had been added, the mixture was allowed to stand at room temperature for about an hour and the ester washed and recovered as in Example I. The triethylene bis(allyl carbonate) obtained was a colorless liquid which had an index of refraction ($N_D^{20}$) of 1.452 and a density ($d_4^{20}$) of 1.135 and the probable formula of this compound was as follows:

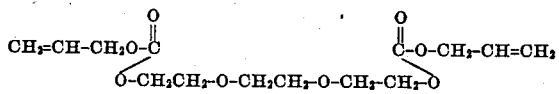

Example III

The process described in Example I was repeated using an equivalent amount of tetraethylene glycol in lieu of ethylene glycol. The ester thus secured was a colorless liquid which had an index of refraction ($N_D^{20}$) of about 1.454, a density of 1.133 to 25° C. Polymerization of this material occurred when distillation was attempted at 2 mm. pressure.

Example IV

The process described in Example I was repeated using an equivalent amount of diethylene glycol in lieu of ethylene glycol. The ester thus obtained was a colorless liquid which had an index of refraction of 1.449 at 20° C., a density of about 1.133 at 20° C./4° C. and a boiling point of about 166° C. at 2 mm. pressure.

Example V 7.2 moles of allyl chloroformate was added dropwise to a solution of 2 moles of glycerine in 7.8 moles of pyridine while cooling the reaction mixture to a temperature of 10 to 15° C. After the chloroformate had been added, the mixture was allowed to stand at room temperature for about 45 minutes. The products were washed with water and recovered as in Example I. The glyceryl tris(allyl carbonate) thus obtained was a colorless liquid having an index of refraction ($N_D^{20}$) of about 1.4558, and a density ($d_4^{20}$) of about 1.194. The probable formula of this compound is:

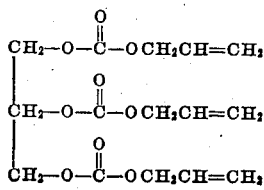

Example VI 4 moles of allyl chloroformate was slowly added to a dispersion of 2 moles of ethylene diamine in 50 percent aqueous sodium hydroxide solution containing 4 moles of NaOH. A substantial quantity of nonhydroscopic white crystals was formed. These crystals were filtered and dried. The product melted at 81–84° C. and was readily soluble in dioxane and acetone. When heated with 5 percent benzoyl peroxide, a hard, yellow, translucent polymer was obtained.

Example VII

A quantity of ethylene glycol bis(allyl carbonate) prepared as in Example I, was dissolved in an equal weight of dioxane and 4 per cent benzoyl peroxide on the basis of the weight of the monomer was introduced. The solution was heated, with stirring, at 80 to 85° C. until the viscosity had increased noticeably. Thereafter, the mixture was cooled and methanol was added to the point of turbidity. It was then added to 5 volumes of methanol with vigorous stirring. The polymer was separated by decantation, dissolved in acetone, reprecipitated with methanol and again recovered. The polymer was then dried under subatmospheric pressure to constant weight. A white granular solid was obtained. A quantity of this polymer was mixed with 5 percent benzoyl peroxide, placed in a mold and heated to 145° C. under a pressure of 2000 pounds per square inch for 15 minutes and a transparent sheet of infusible, insoluble polymer was obtained.

Example VIII

A quantity of diethylene glycol bis(allyl carbonate) prepared as in Example IV, was dissolved in an equal weight of dioxane and 4 percent benzoyl peroxide on the basis of the weight of the polymer was introduced. The solution was heated, with stirring, at 80 to 85° C. until the viscosity doubled. Thereafter, the mixture was cooled and methanol was added to the point of turbidity. It was then added to 5 volumes of methanol with vigorous stirring. The polymer was separated by decantation, dissolved in acetone, reprecipitated with methanol and again recovered. The polymer was then dried under subatmospheric pressure to constant weight. A white fusible polymer was obtained. A quantity of this polymer was mixed with 5 percent benzoyl peroxide, placed in a mold and heated to 150° C. under a pressure of 2000 lbs. per sq. in. for 20 minutes. A transparent sheet of infusible, insoluble polymer was obtained.

Example IX

A quantity of polyvinyl alcohol was dissolved by heating with about 10 times its weight of pyridine for 16 hours at 85° C. The solution was cooled to about 0° C. and mixed with cold allyl chloroformate while maintaining the temperature at 5 to 7° C. The mixture was stirred, warmed to 40° C. and poured into water slightly acidified with hydrochloric acid. A white sticky gum was precipitated. This gum was dissolved, reprecipitated with water from acetone solution and a tough, white polymer was obtained. This product cured to an infusible, insoluble state upon heating with 5 percent benzoyl peroxide.

Example X

A quantity of glyceryl tri(allyl carbonate) containing 5 percent benzoyl peroxide was heated at 75° C. for 18 hours and a hard, colorless solid was obtained.

Although the present invention has been described with reference to the specific details of certain embodiments thereof, it is not intended that such details shall be regarded as limitations upon the scope of the invention, except insofar as included in the accompanying claims.

We claim:
1. Tetraethylene glycol bis(allyl carbonate).
2. A polymer of tetraethylene glycol di(methallyl carbonate).
3. Tetraethylene glycol bis(methallyl carbonate).
4. A polymer of tetraethylene glycol bis(allyl carbonate).
5. An ester of (A) one molecular equivalent of tetraethylene glycol and (B) two molecular equivalents of a half ester of carbonic acid and an alcohol of the group consisting of allyl, methallyl and crotyl alcohols.
6. A polymer of ester defined in claim 5.
7. Tetraethylene glycol bis(crotyl carbonate).
8. A polymer of tetraethylene glycol bis(crotyl carbonate).

IRVING E. MUSKAT.
FRANKLIN STRAIN.